(12) United States Patent
Jaakkola

(10) Patent No.: US 6,428,275 B1
(45) Date of Patent: Aug. 6, 2002

(54) HELICAL WIND ROTOR AND A METHOD FOR MANUFACTURING THE SAME

(75) Inventor: Reijo Jaakkola, Hämeenkoski (FI)

(73) Assignee: Shield Oy, Helsinki (FI)

( * ) Notice: Subject to any disclaimer, the term of this patent is extended or adjusted under 35 U.S.C. 154(b) by 0 days.

(21) Appl. No.: 09/446,926

(22) PCT Filed: May 6, 1999

(86) PCT No.: PCT/FI98/00386

§ 371 (c)(1),
(2), (4) Date: Feb. 11, 2000

(87) PCT Pub. No.: WO99/04164

PCT Pub. Date: Jan. 28, 1999

(30) Foreign Application Priority Data

Jun. 30, 1997 (FI) .................................................. 972806

(51) Int. Cl.⁷ ............................................... F03D 11/02
(52) U.S. Cl. ............ 416/176; 416/197 A; 416/DIG. 2; 416/DIG. 4
(58) Field of Search .................. 415/4.2, 4.4, 72, 415/75, 907; 416/176, 197 A, DIG. 2, DIG. 4, DIG. 9

(56) References Cited

U.S. PATENT DOCUMENTS

| | | | | |
|---|---|---|---|---|
| 1,100,332 A | * | 6/1914 | Smith | 416/176 |
| 3,144,204 A | * | 8/1964 | Bohanon | 416/232 |
| 3,941,504 A | * | 3/1976 | Snarbach | 416/197 A |
| 4,086,026 A | * | 4/1978 | Tamanini | 416/176 |
| 4,236,866 A | * | 12/1980 | Zapata Martinez | 415/2 R |
| 4,293,274 A | | 10/1981 | Gilman | |
| 4,718,821 A | * | 1/1988 | Clancy | 416/44 |
| 6,036,443 A | * | 3/2000 | Gorlov | 416/176 |

FOREIGN PATENT DOCUMENTS

| | | |
|---|---|---|
| FI | 65940 | 12/1924 |
| FI | 67919 | 6/1985 |
| JP | 60-90992 | 2/1985 |
| WO | WO 81/01443 | 5/1981 |

* cited by examiner

Primary Examiner—Edward K. Look
Assistant Examiner—Ninh Nguyen
(74) Attorney, Agent, or Firm—Connolly Bove Lodge & Butz, LLP

(57) ABSTRACT

Helical wind rotor, comprising at least two blades (1) which, as observed in cross section, are of substantially equivalent shape and curved, and are located parallel with the rotational axis (o) and so that the blades (1) are arranged most suitably at equal intervals with respect to the rotation angle of a cylindrical co-ordinate system (o, z). In order to bring about helical form of the wind rotor, the blade cross sections (sp) are arranged to revolve in the longitudinal direction (z) of the wind rotor. The blade cross section (sp) belonging to the wind rotor is arranged substantially different from the shape of semicircle, so as to enable manufacturing of the blade of a substantially planar blank. The invention also relates to a method for manufacturing a wind rotor of the above presented type.

5 Claims, 7 Drawing Sheets

| H | Rotor height |
| --- | --- |
| Q | Gap between blade inner edges |
| U | Total helical torsion of blade |
| E | Blade helical slope = U/H |
| φ | Polar angle in xy-plane, φ = 0 at inner edge |
| s(φ) | Length of xy-section, starting at inner edge |
| f(φ) | Distance from rotor axis to blade point |

| z | Height co-ordinate, at rotor top z = H |
| g($\phi$) | Length of an xy-section point trace |
| $\beta(\phi)$ | Inclination angle of xy-section point trace |

$\rho(\phi)$ Radius of the circular annulus $\rho_0$ Inner radius of annulus $\rho_\pi$ Outer radius of annulus $\xi(\phi)$ Horizontal co-ordinate of the section curve $\eta(\phi)$ Vertical co-ordinate of the section curve $\theta(\phi)$ Angle of a radius drawn to the section curve, with respect to horizontal direction $\psi$ Angle of the entire annular sector

HELICAL WIND ROTOR AND A METHOD FOR MANUFACTURING THE SAME

BACKGROUND OF THE INVENTION

1. Field of the Invention

The invention concerns a helical wind rotor, comprising at least two blades which, as observed in cross section, are of substantially equivalent shape and curved, and are located parallel with the rotational axis and so that the blades are arranged most suitably at equal intervals with respect to the rotation angle of a cylindrical co-ordinate system. In order to bring about helical form of the wind rotor, the blade cross sections are arranged to revolve in the longitudinal direction of the wind rotor.

2. Discussion of Background Art

A conventional rotor of the above presented type, the so called Savonius-rotor, patented e.g. in Finland with number 65940, consists of two blades of the shape of semicircular cylinder, which are located symmetrically with respect to the rotational axis. The cross section of this kind of rotor remains constant along the longitudinal direction and furthermore, the top and bottom edges are provided with cap plates.

In order to further develop the above mentioned rotor, a further reshaped wind rotor is presented in the Finnish patent number 67919. In this so called Windside rotor, the cap plates are removed and a helical form is added, so as to eliminate the so called dead positions in the rotor. In this wind rotor the xy-plane cross section revolves evenly around the wind rotor vertical axis while moving in the longitudinal direction of the wind rotor. The rotor design in question comprises a chassis and two oblong blades with a curved cross section, and which are arranged in the axial direction around the geometrical axis symmetrically, so that the concave blade sides partially overlap each other, leaving an axial gap between the blade inner edges. In addition, the blades are twisted in a helical manner relative to each other. The rotor shaft which is a part of the rotor structure is parallel to the geometrical axis and connected at one end to the chassis. The rotor structure contains, transversally to the rotor shaft, rib-like adapters which connect the blade edges to each other, so as to reinforce the structure. The wind rotor adapters are adjusted successively in the longitudinal direction and additionally, they are domed in cross section, for example in the form of an aircraft wing profile. The concerned publication presents wind rotor applications where the torsion of blades is 180°.

The above depicted developed wind rotor is especially due to its helical shape distinctly more advantageous than the former comparable ones, because wind from almost any direction causes wind rotor movement. A vital problem related to this type of wind rotor is, nevertheless, the difficulty of its manufacturing which necessitates always making a full wind rotor length mould, because the blades cannot be manufactured by forming of planar sheet blanks. Therefore also the manufacturing costs of the wind rotor type in question are very high, because the manufacturing requires firstly very accurate dimensioning and secondly also high professional skill, in order to arrive at the desired result. Another problem associated with this solution is also that when wind rotors are manufactured with slightly variant dimensioning, entirely individual moulds must be separately dimensioned and manufactured for each.

SUMMARY OF THE INVENTION

The helical wind rotor according to this invention is intended to bring about a decisive improvement in the problems described above and thus to essentially enhance the level of technology in this field. To achieve this aim, the wind rotor according to the invention is mainly characterised by that the cross section of the blade belonging to the wind rotor is arranged substantially different from the shape of semicircle, so as to enable manufacturing of the blade of a substantially planar blank.

The most important advantage of the wind rotor according to the invention is facilitating its manufacturing, because it is not necessary to make a concrete full wind rotor length mould, but the desired wind rotor shape can be created even very easily, depending on raw material, for example by mangling planar blade blanks or by bending to the correct shape blade blanks made of elastic material. Using for example thin metal sheets or polymer sheets, the blade may be supported to correct position at only top and bottom edges with for instance a tubular chassis, and the rigid shaft structure keeps the correct height and the rest of the blade settles to correct shape. Accordingly, the blade may also be supported along the helix curves of the inner and outer edges. The manufacturing costs of a wind rotor according to the invention are therefore particularly inexpensive, and also manufacturing of wind rotors of slightly variant dimensioning is easily and accurately feasible, owing to the computational shape definition for the planar blade blanks.

Advantageous embodiments of the wind rotor according to the invention are presented in the related independent claims.

The invention relates also to a method for manufacturing a wind rotor.

The most important advantages of the method according to the invention are its technical simplicity and clarity of the computational preparation or the shape definition for the planar blade blank, which further enables manufacturing of a wind rotor at a very low cost. The vital advantage of the method is that, contrary to prior methods of manufacturing of wind rotors of comparable type, the wind rotor can be dimensioned computationally as unambiguous planar blanks which can be further formed into a very accurately dimensioned wind rotor, using an appropriate method for sheet material forming. The method according to the invention is exceptionally advantageous especially because a full wind rotor length mould is no more necessary, but a wind rotor according to the invention can be assembled using very simple supporting structures, by bending the computationally defined planar blade blank into desired shape. Another vital advantage of the invention is also that the raw material for blades can be chosen more diversely than in prior solutions.

BRIEF DESCRIPTION OF THE DRAWINGS

The invention is clarified in detail in the following explanation where.

DESCRIPTION OF PREFERRED EMBODIMENTS

Helical wind rotor, comprising at least two blades 1 which, as observed in cross section, are of substantially equivalent shape and curved, and are located parallel with the rotational axis o and so that the blades 1 are arranged most suitably at equal intervals with respect to the rotation angle of a cylindrical co-ordinate system o,z. In order to bring about helical form of the wind rotor, the blade cross sections sp are arranged to revolve in the longitudinal direction z of the wind rotor. The blade cross section sp belonging to the wind rotor is arranged substantially different from the shape of semicircle, so as to enable manufacturing of the blade of a substantially planar blank.

Figure 1:
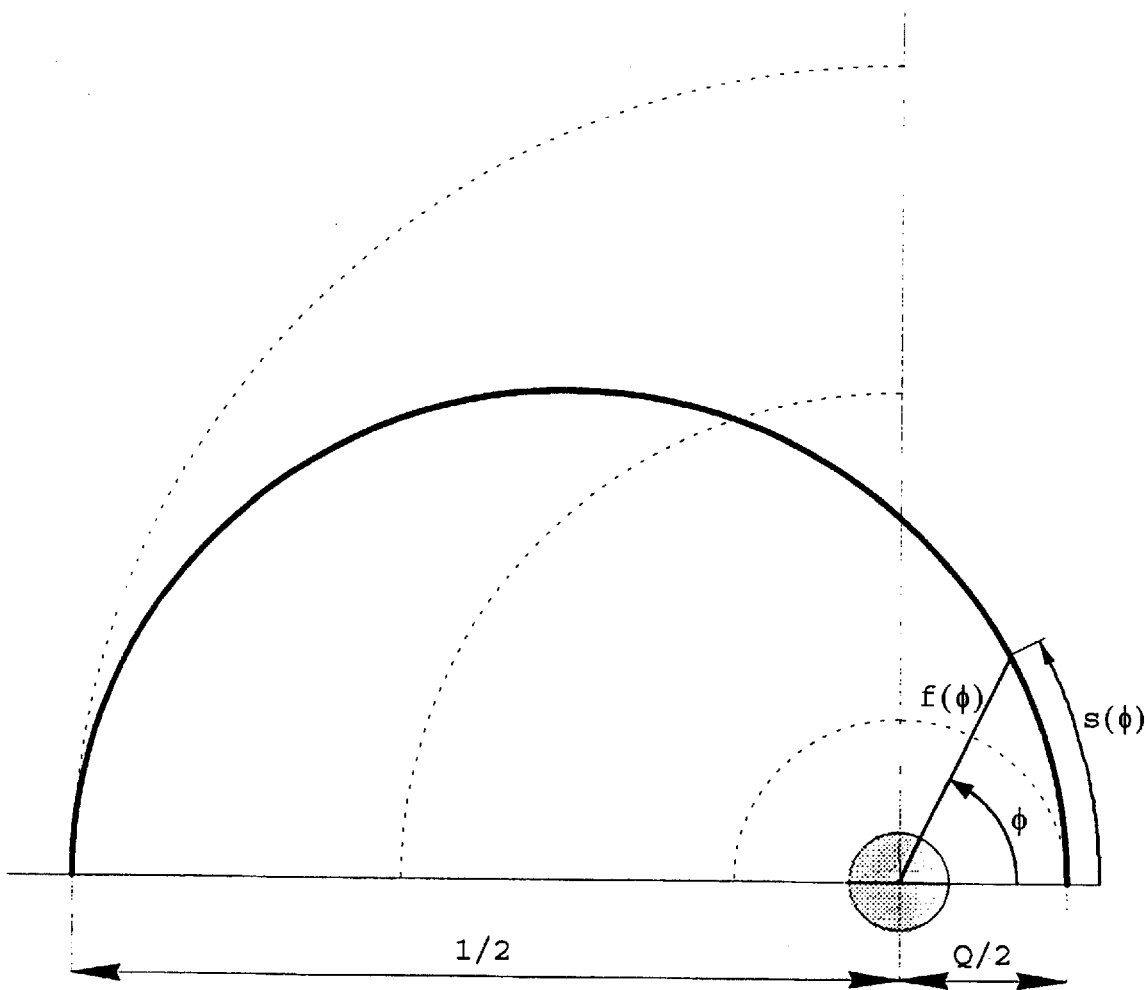
FIG. 1 presents the cross section of the blade belonging to a conventional wind rotor and the parameters used in the related mathematical study.
Figure 2:
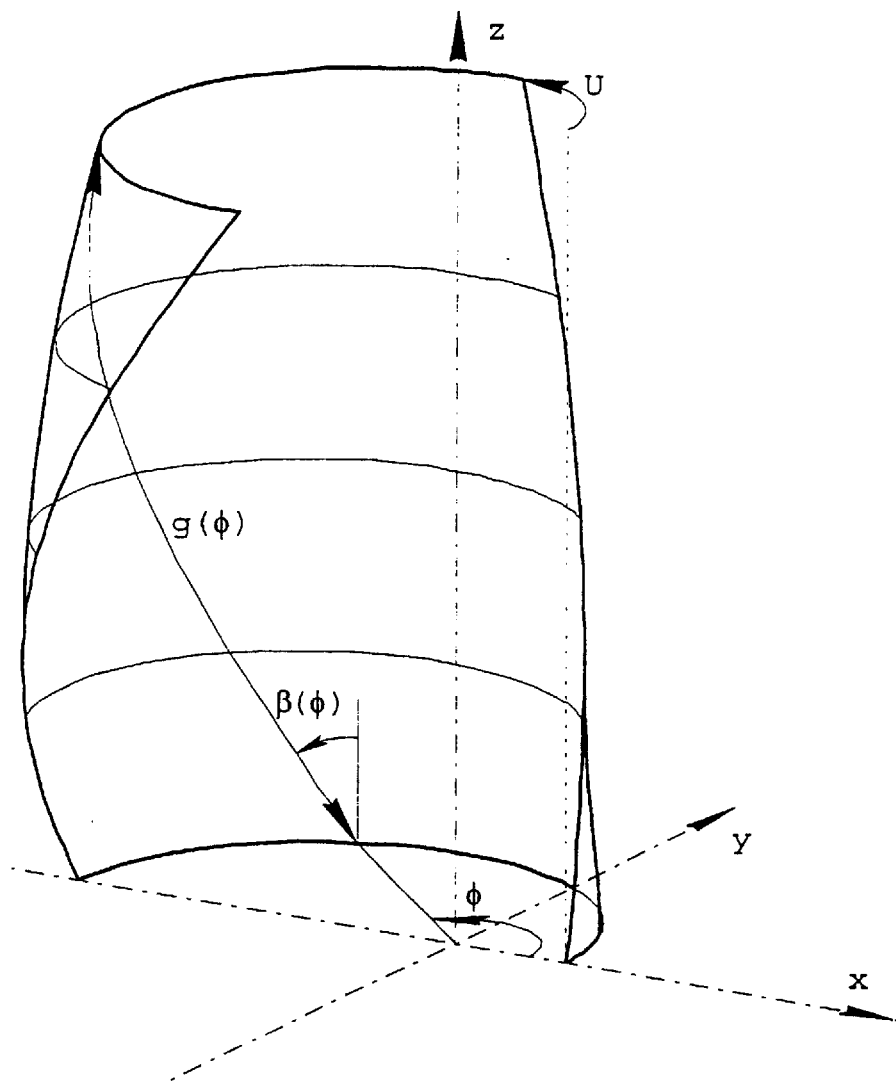
FIG. 2 presents a blade belonging to a conventional wind rotor as a parallel projection and the parameters related to three-dimensionality, used in the mathematical study.
Figure 3:
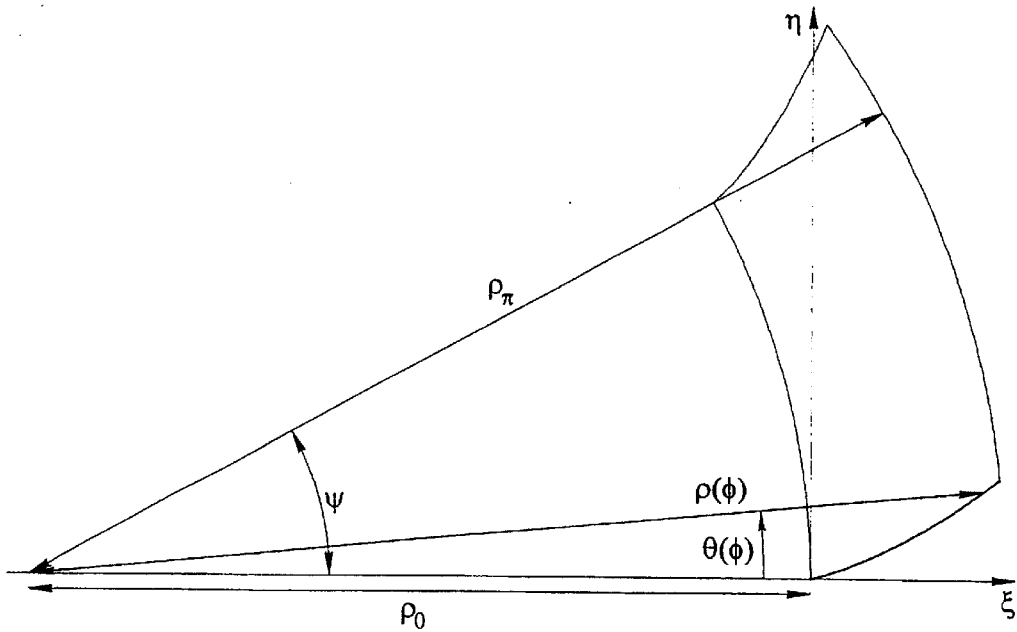
FIG. 3 presents a planar unfolded blade belonging to a wind rotor according to the invention and parameters related to planar unfolding, used in the mathematical study.
Figure 4:
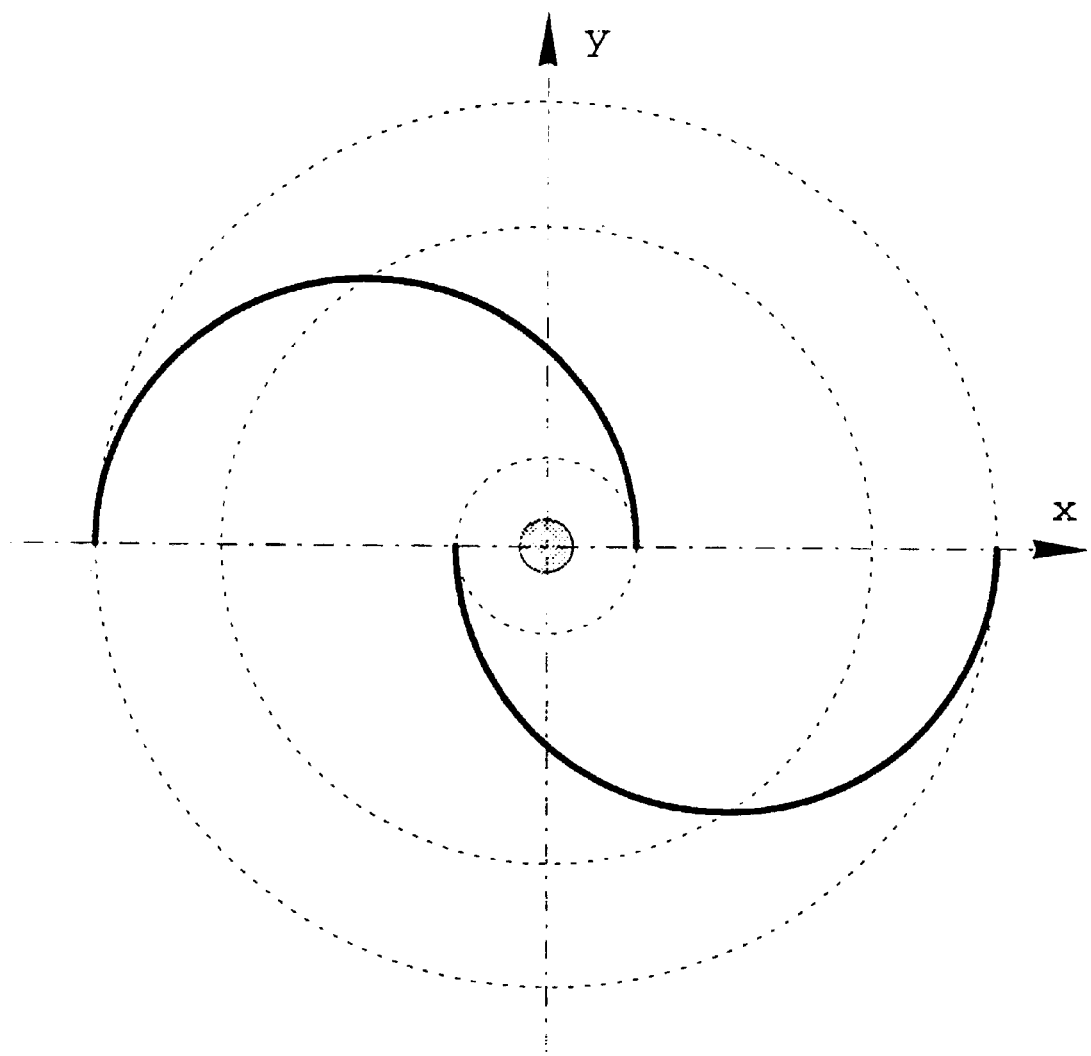
FIG. 4 presents the cross section of a conventional wind rotor.
Figure 5:
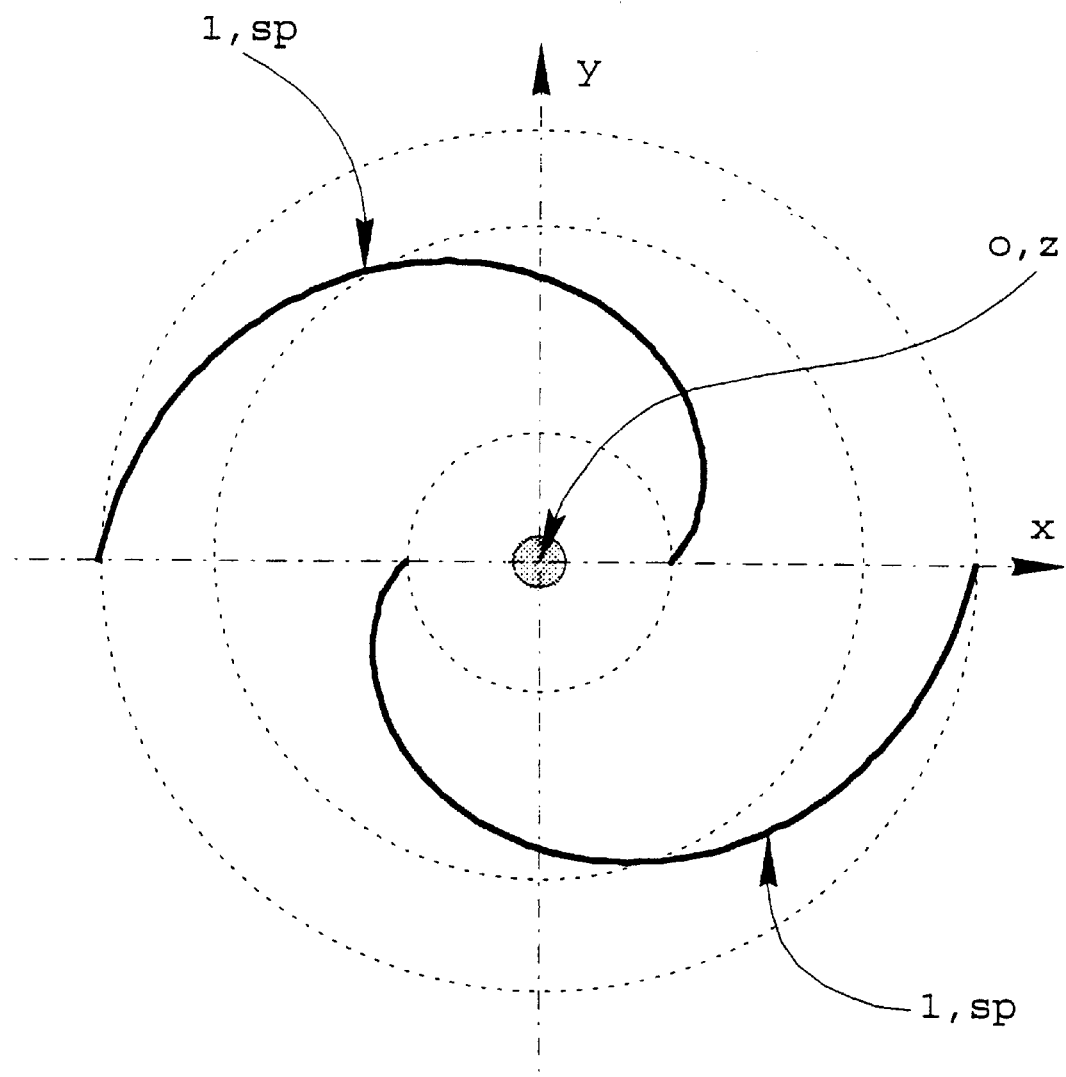
FIG. 5 presents the cross section of a wind rotor according to the invention.

As an advantageous embodiment of the invention, particularly referring to FIGS. 1, 2, and 3, and using the parameters declared in them, the shape $f(\phi)$ of the cross section sp and the section curve $\xi(\phi)$, $\eta(\phi)$ of the planar unfolded blade 1' is defined as a boundary value problem:

$$\xi'(\phi)^2 + \eta'(\phi)^2 = f(\phi)^2 + f'(\phi)^2$$

$$\frac{Ef(\phi)\left(\frac{H}{\psi}\sqrt{1+\frac{E^2Q^2}{4}} + \xi(\phi)\right) + \eta(\phi)}{\frac{H}{\psi}\sqrt{1+\frac{E^2Q^2}{4}} + \xi(\phi) - Ef(\phi)\eta(\phi)} = \frac{\eta'(\phi)}{\xi'(\phi)}$$

$$\left(\frac{H}{\psi}\sqrt{1+\frac{E^2Q^2}{4}} + \xi(\phi)\right)^2 + \eta(\phi)^2 = \frac{H^2}{\psi^2}(1+E^2f(\phi)^2)$$

$\xi(0)=0$
$\eta(0)=0$
$f(0)=Q/2$
$f(\pi)=1/2$

Figure 6:
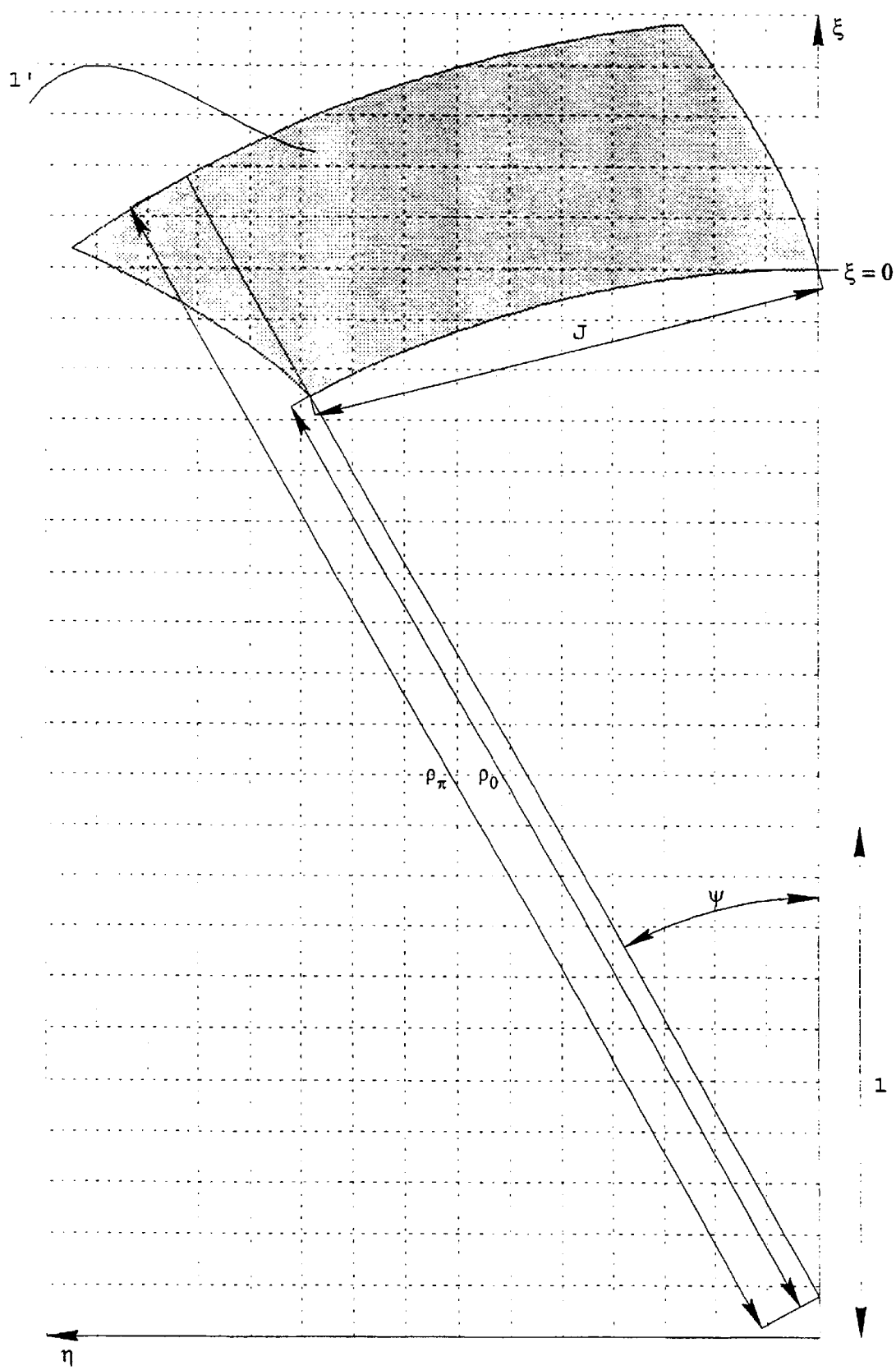
FIG. 6 presents a planar unfolded blade belonging to a wind rotor according to the invention.

Further the planar unfolded blade 1' presented in FIG. 6 is a part cut off a circular annulus, whose other dimensions are defined by the equations:

$$\rho_0 = \frac{H}{\psi}\sqrt{1+\frac{E^2Q^2}{4}}$$

$$\rho_\pi = \frac{H}{\psi}\sqrt{1+\frac{E^2}{4}}$$

Figure 7:
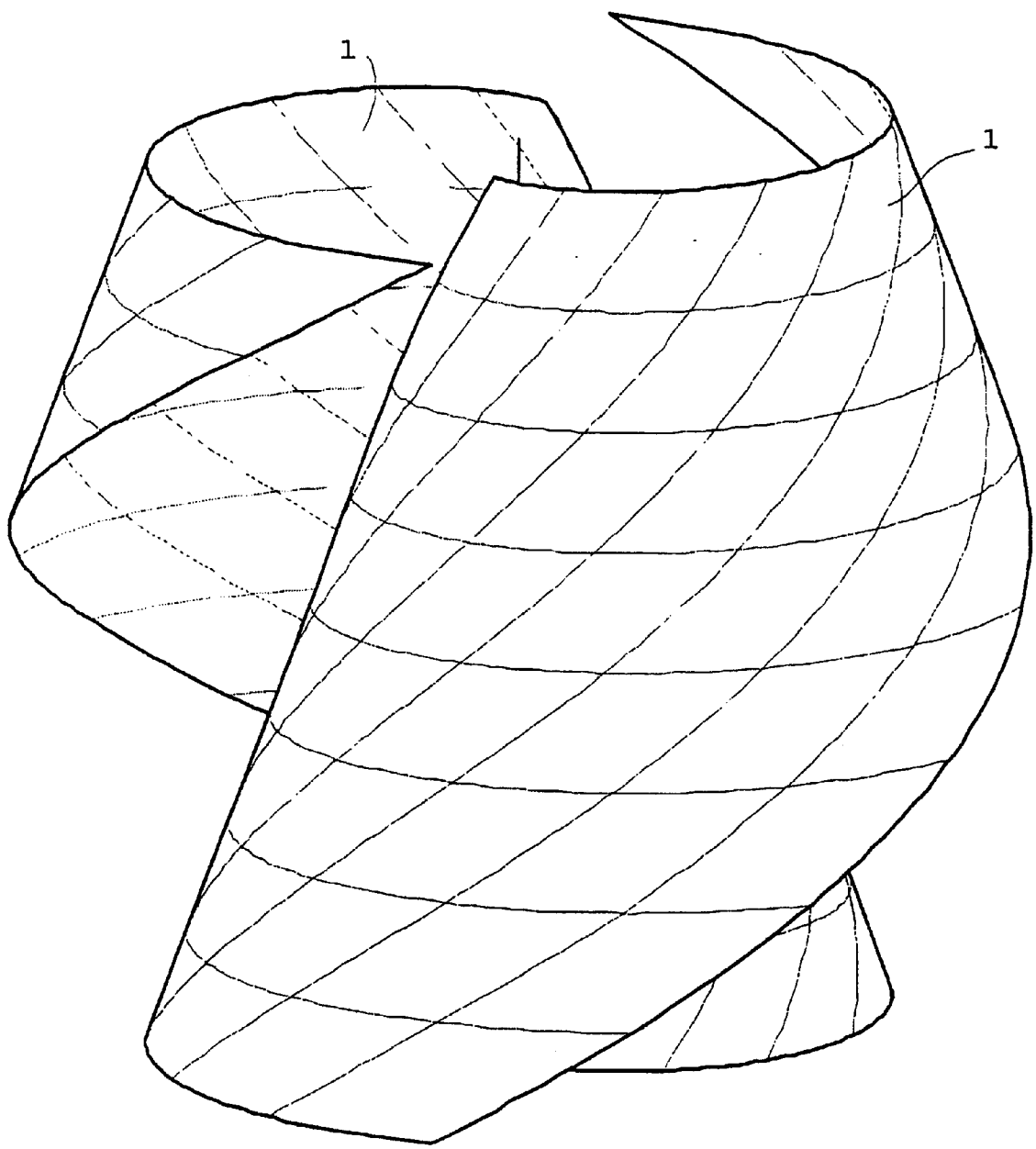
FIG. 7 presents the blades of a wind rotor according to the invention as a parallel projection.

Further as an advantageous embodiment, particularly related to the solution presented in FIG. 7, the total helical torsion of the wind rotor is U=180° and the rotor height H=2. Considering practical applications, using a more elongated rotor may be advantageous, for instance H=4. It is naturally possible to use also helical 90° or also any other angle. Further it is possible to construct a wind rotor of for example three blades in same cross section.

Hence, the method according to the invention is based on manufacturing the blade of a substantially planar blank, whereat the blade cross section is arranged substantially different from the shape of semicircle.

An argument for the above said is seen through mathematical study where, using the parameters presented in FIGS. 1 and 2, the following equations are obtained for a semicircular blade xy-plane section:

Equation 1:

$$f(\phi) = -\frac{1-Q}{4}\cos(\phi) + \frac{1}{4}\sqrt{(1-Q)^2\cos(\phi)^2 + 4Q}$$

Regardless of the xy-plane section shape, it may be stated:

Equation 2:

$$s(\phi) = \int_0^\phi \sqrt{f(t)^2 + f'(t)^2}\, dt$$

$$g(\phi) = H\sqrt{E^2 f(\phi)^2 + 1} \qquad\qquad \text{Equation 3}$$

$$\tan(\beta(\phi)) = E\, f(\phi) \qquad\qquad \text{Equation 4}$$

If the blade surface is to be unfolded to plane, the first requirement is that the corner angles $\beta(0)$ and $\beta(\pi)$ in top and bottom edges shall be correct. Because $\beta(\phi)$ is not constant, the bottom edge cannot be mapped as a straight line.

The blank is placed so that the upward spiral edges are mapped vertical and the inner corner of bottom edge is at bottom to the left. Because the traces of different points of the xy-plane section are of different length, the vertical blank edge cannot be straight, either. Yet, because it must have a constant width, it should be mapped as an annular sector. The regularity in vertical direction implies that it is specifically a circular annulus.

Next, the concepts related to the geometry of the planar unfolded blade and in particular the concepts related to its lower edge or the unfolded section curve:

$\rho(\phi)$ Radius of annulus, $\rho_0$ inner radius of annulus, $\xi(\phi)$ horizontal co-ordinate of the section curve, $\eta(\phi)$ vertical co-ordinate of the section curve, $\theta(\phi)$ angle of a radius drawn to the section curve, with respect to horizontal direction, $\psi$ angle of the entire annular sector.

The section curve now starts to direction angle $\beta(0)$ at the low left point $\xi=0$, $\eta=0$, and its length along the curve is $s(\phi)$. The co-ordinates cannot generally be stated in closed form. The derivatives on $\phi$ may be stated as:

$$\xi'(\phi) = s'(\phi)\cos(\beta(\phi)+\theta(\phi)) = \sqrt{f(\phi)^2 + f'(\phi)^2}\cos(\beta(\phi)+\theta(\phi)) \quad \text{Equation 5}$$

$$\eta'(\phi) = s'(\phi)\sin(\beta(\phi)+\theta(\phi)) = \sqrt{f(\phi)^2 + f'(\phi)^2}\sin(\beta(\phi)+\theta(\phi)) \quad \text{Equation 6}$$

The following dependency is obtained for the angle $\theta(\phi)$:

Equation 7:

$$\tan(\theta(\phi)) = \frac{\eta(\phi)}{\rho_0 + \xi(\phi)}$$

A general formula for the sector bend radius is obtained straightforward:

Equation 8:

$$\rho(\phi) = \frac{g(\phi)}{\psi}$$

$$= \frac{H}{\psi}\sqrt{E^2 f(\phi)^2 + 1}$$

The bend radius may also be presented as function of the ξ- and η-co-ordinates as follows:

$$\rho(\phi) = \sqrt{(\rho_0 + \xi(\phi))^2 + \eta(\phi)^2}$$  Equation 9

The equations 5 through 9 yield a set of three differential equations for three unknown functions $f(\phi)$, $\xi(\phi)$ ja $\eta(\phi)$:

$$\xi'(\phi)^2 + \eta'(\phi)^2 = f(\phi)^2 + f'(\phi)^2$$  Equation 10

Equation 11:

$$\frac{Ef(\phi)\left(\frac{H}{\psi}\sqrt{1+\frac{E^2Q^2}{4}} + \xi(\phi)\right) + \eta(\phi)}{\frac{H}{\psi}\sqrt{1+\frac{E^2Q^2}{4}} + \xi(\phi) - Ef(\phi)\eta(\phi)} = \frac{\eta'(\phi)}{\xi'(\phi)}$$

Equation 12:

$$\left(\frac{H}{\psi}\sqrt{1+\frac{E^2Q^2}{4}} + \xi(\phi)\right)^2 + \eta(\phi)^2 = \frac{H^2}{\psi^2}(1+E^2 f(\phi)^2)$$

The initial conditions for functions $\xi(\phi)$ and $\eta(\phi)$ are obtained directly from the definition:

$$\xi(0)=0$$

$$\eta(0)=0$$  Equation 13

Requiring that the section curve start and end points fall on the same straight line with the rotor axis, the following boundary conditions are obtained:

$$f(0)=Q/2$$

$$f(\pi)=1/2$$  Equation 14

The semicircular section curve of a Windside-rotor (FI 67919) or equation 1 does not satisfy the requirement stated in equations 10 through 14.

The special case where the torsion angle approaches zero is a singularity. Then the inclination angle $\beta(\phi)$ approaches constant zero, $g(\phi)$ approaches constant one, and the bend radius ρ increases to infinity. In this case of an upright blade, any function $f(\phi)$ satisfies the condition set for a blank which can be unfolded to plane.

The task is now to work out which shapes satisfy the requirement presented in equations 10 through 14. The complicated non-linear set of differential equations can only be solved by numerical methods. Having set the parameter Q, a blank sector angle ψ satisfying the boundary condition of equation 14 is searched by trial and iteration. The solution yields an approximation of the functions $f(\phi)$, $\xi(\phi)$, and $\eta(\phi)$.

It is seen that for each value of parameter Q can be found a unique solution, when the value falls in the range (δ, 1), where δ is a low limit, in the vicinity of the value 0.2. A solution cannot be found at smaller values and when approaching the low limit, the shape is unfavourable in the respect that the curve starts rather steeply away from the rotor axis. Other blade shapes which can be unfolded to plane may be found if the basic geometry stated in the beginning is somehow modified.

In order to draw a planar blank, the rest of blank dimensions are yet to be solved. From equation 8. the inner and outer edge radii for the annular sector are obtained:

Equation 15:

$$\rho_0 = \frac{H}{\psi}\sqrt{1+\frac{E^2Q^2}{4}} \qquad \rho_\pi = \frac{H}{\psi}\sqrt{1+\frac{E^2}{4}}$$

The inner edge cord J and the inclination angle function $\beta(\phi)$ are obtained further from the equations:

$$J = 2\rho_0 \sin(\psi/2)$$  Equation 16

$$\beta(\phi) = \arctan(E f(\phi))$$  Equation 17

FIG. 7 presents a wind rotor shaped according to the procedure presented above as a parallel projection.

The material for a planar blank shall be such that it bends but does not stretch too easily. Thin metal sheets and many polymer sheets behave just like that. When the structure is supported only at top and bottom edges with for instance a tubular chassis and the rigid shaft structure keeps the correct height, the rest of the blade settles to correct shape. On the other hand, bending elasticity tends to stretch the wind rotor in longitudinal direction, which implies that fastening of the shaft and the blade must be designed to cope with this strain. Considering the wind rotor operation, it is also essential that the shaft vicinity is open so that air flow can pass from one blade to another, which naturally has to be taken into account when designing for instance potential support structures.

It is obvious that the invention is not limited by the embodiments presented or described above, but it can be modified within the same basic idea. For example, the boundary conditions of equation 10 have been chosen so that the start and end point of the blade cross section and the rotor axis are all on the same straight line. The boundary conditions for the differential equation can also be selected otherwise, still enabling unfolding of the blade into plane. In such cases for instance a blade may be obtained, where a strip is removed from either edge, or which is extended either inwards or outwards. It is also possible to support the rotor blades elastically so that in strong wind the rotor diameter temporarily increases.

What is claimed is:

1. A helical wind rotor, comprising:
   at least two blades, each of said at least two blades being curved in a substantially equivalent shape in a cross-section in a plane perpendicular to a rotational axis of the wind rotor, and being arranged parallel with the rotational axis,
   wherein the at least two blades am arranged at equal angular intervals around the rotational axis,
   wherein a blade cross section of each of said at least two blades is arranged to revolve about the rotational axis,
   wherein the blade cross section of said each of said at least two blades is shaped so that corresponding points in each of a plurality of sequential blade cross-sections of each of said at least two blades traces a shape of a helical screw-line on a respective blade surface,
   wherein each of said at least two blades corresponds to a planar unfolded blade defined by a portion of a circular annulus.

2. The wind rotor according to claim 1, wherein the shape of the blade cross section, dimensions of the circular annulus, and a section curve are defined by the equations;

$$\xi'(\phi)^2 - \eta'(\phi)^2 = f(\phi)^2 - f'(\phi)^2,$$

$$\frac{Ef(\phi)\left(\frac{H}{\psi}\sqrt{1+\frac{E^2Q^2}{4}} + \xi(\phi)\right) + \eta(\phi)}{\frac{H}{\psi}\sqrt{1+\frac{E^2Q^2}{4}} + \xi(\phi) - Ef(\phi)\eta(\phi)} = \frac{\eta'(\phi)}{\xi'(\phi)},$$

$$\left(\frac{H}{\psi}\sqrt{1+\frac{E^2Q^2}{4}} + \xi(\phi)\right)^2 + \eta(\phi)^2 = \frac{H^2}{\psi^2}(1+E^2f(\phi)^2),$$

$\xi(0)=0$,
$\eta(0)=0$,
$f(0)=0$,
$f(\pi)=0$, $$\rho_0 = \frac{H}{\psi}\sqrt{1+\frac{E^2Q^2}{4}}$$

$$\rho_\pi = \frac{H}{\psi}\sqrt{1+\frac{E^2}{4}}, \text{ where}$$

H=rotor height,
Q=gap between blade inner edges, in proportion to the rotor diameter,
$\phi$=xy-plane polar angle co-ordinate, $\phi$=0 at blade inner edge,
$f(\phi)$=distance from rotor axis to a blade point as a function of polar angle $\phi$, in proportion to the rotor diameter,
$\xi(\phi)$=horizontal coordinate of the unfolded section curve,
$\eta(\phi)$=vertical co-ordinate of the unfolded section curve,
$\rho_0$=inner radius of circular annulus,
$\rho_\pi$=outer radius of circular annulus,
$\psi$=angle of entire annular sector,
U=total helical torsion of blade, and
E=helical slope of blade=U/H.

3. The wind rotor according to claim 1, wherein the total helical torsion of the blade U=$\pi$ or 180° and rotor height H=4.

4. A method for manufacturing a helical wind rotor which includes at least two blades, each of said at least two blades being curved in a substantially equivalent shape in a blade cross-section in a plane perpendicular to a rotational axis of the wind rotor, and being arranged parallel with the rotational axis,
wherein the at least two blades are arranged at equal angular intervals around the rotational axis,
wherein a blade cross section of each of said at least two blades is arranged to revolve around the rotational axis of the wind rotor, the method comprising:
providing at least one planar blank;
shaping the at least one planar blank to a blade shape having said blade cross-section,
wherein said blade shape is shaped such that corresponding points in each of a plurality of sequential blade cross-sections of each of said at least two blades traces a shape of a helical screw-line on a respective blade surface,
wherein said blade cross-section remains the same along any cross-section taken along the longitudinal direction.

5. The method according to claim 4, further comprising, before said providing step, shaping the at least one planar blank from a circular annulus, wherein the blade cross section, dimensions of the circular annulus, and a section curve are defined by the equations:

$$\xi'(\phi)^2 - \eta'(\phi)^2 = f(\phi)^2 - f'(\phi)^2,$$

$$\frac{Ef(\phi)\left(\frac{H}{\psi}\sqrt{1+\frac{E^2Q^2}{4}} + \xi(\phi)\right) + \eta(\phi)}{\frac{H}{\psi}\sqrt{1+\frac{E^2Q^2}{4}} + \xi(\phi) - Ef(\phi)\eta(\phi)} = \frac{\eta'(\phi)}{\xi'(\phi)},$$

$$\left(\frac{H}{\psi}\sqrt{1+\frac{E^2Q^2}{4}} + \xi(\phi)\right)^2 + \eta(\phi)^2 = \frac{H^2}{\psi^2}(1+E^2f(\phi)^2),$$

$\xi(0)=0$,
$\eta(0)=0$,
$f(0)=0$,
$f(\pi)=0$, $$\rho_0 = \frac{H}{\psi}\sqrt{1+\frac{E^2Q^2}{4}}$$

$$\rho_\pi = \frac{H}{\psi}\sqrt{1+\frac{E^2}{4}}, \text{ where}$$

H=rotor height,
Q=gap between blade inner edges, in proportion to the rotor diameter,
$\phi$=xy-plane polar angle co-ordinate, $\phi$=0 at blade inner edge,
$f(\phi)$=distance from rotor axis to a blade point as a function of polar angle $\phi$, in proportion to the rotor diameter,
$\xi(\phi)$=horizontal coordinate of the unfolded section curve,
$\pi(\phi)$=vertical co-ordinate of the unfolded section curve,
$\rho_0$=inner radius of circular annulus,
$\rho_\pi$=outer radius of circular annulus,
$\psi$=angle of entire annular
U=total helical torsion of blade, and
E=helical slope of blade=U/H.

* * * * *